US010961083B2

(12) United States Patent
Di Giovine

(10) Patent No.: US 10,961,083 B2
(45) Date of Patent: Mar. 30, 2021

(54) APPARATUS FOR THE TRANSPORT OF A DEVICE ALONG A CONSTRUCTION

(71) Applicant: C&E GROUP S.R.L., Oggiono (IT)

(72) Inventor: Vicenzo Di Giovine, Lecco (IT)

(73) Assignee: C&E GROUP S.R.L., Oggiono (IT)

( * ) Notice: Subject to any disclaimer, the term of this patent is extended or adjusted under 35 U.S.C. 154(b) by 42 days.

(21) Appl. No.: 16/377,274

(22) Filed: Apr. 8, 2019

(65) Prior Publication Data

US 2019/0315599 A1 Oct. 17, 2019

(30) Foreign Application Priority Data

Apr. 11, 2018 (IT) .......................... 102018000004386

(51) Int. Cl.
| | |
|---|---|
| *B66B 9/187* | (2006.01) |
| *B66B 7/02* | (2006.01) |
| *F16L 3/01* | (2006.01) |
| *F16M 13/02* | (2006.01) |

(52) U.S. Cl.
CPC .............. *B66B 9/187* (2013.01); *B66B 7/022* (2013.01); *F16L 3/01* (2013.01); *F16M 13/022* (2013.01)

(58) Field of Classification Search
CPC ......... B65G 69/003; B66B 9/187; B66B 9/02; B66B 7/022; B66B 11/006; F16L 3/01; F16M 13/022; F23G 7/085; F23Q 9/00; B65F 3/02; B65F 3/0804; B65F 3/041; B65F 3/046; B65F 2003/024; B65F 2003/0269; B65F 2003/0273; B65F 2003/0296; B65F 2003/025

USPC ................................ 414/598, 628, 648, 662
See application file for complete search history.

(56) References Cited

U.S. PATENT DOCUMENTS

| | | | |
|---|---|---|---|
| 2,592,324 A * | 4/1952 | Oliver ...................... | B65F 3/08 414/409 |
| 4,306,634 A * | 12/1981 | Sangster ................... | B66B 9/02 187/267 |
| 4,579,522 A | 4/1986 | MacDonald | |
| 4,597,710 A * | 7/1986 | Kovats ...................... | B65F 3/08 187/302 |
| 4,854,855 A | 8/1989 | Rajewski | |
| 5,634,788 A | 6/1997 | Rajewski | |
| 5,803,726 A | 9/1998 | Bacon | |
| 2005/0023082 A1 * | 2/2005 | Korchagin .............. | B66B 9/187 182/82 |
| 2015/0252943 A1 | 9/2015 | Di Giovine | |

* cited by examiner

*Primary Examiner* — Glenn F Myers
(74) *Attorney, Agent, or Firm* — Mark M. Friedman

(57) ABSTRACT

The present invention relates to an apparatus for the transport of a device along a construction, which comprises a rail which can be fixed to a construction and a transport carrier, which is equipped with a carriage slidably constrained to the rail and is intended to carry a device to be transported. The transport carrier comprises an oscillating frame, which is rotatably constrained to the carriage by means of a hinge and is intended to carry the device fixed thereto. Moreover, the apparatus comprises an orientation system mechanically connected to the transport carrier and configured to move, when the transport carrier is brought to the service position at the terminal portion of the construction, the oscillating frame to rotate between a non-operative position and an operative position in order to correctly position the device at the terminal portion of the construction.

9 Claims, 15 Drawing Sheets

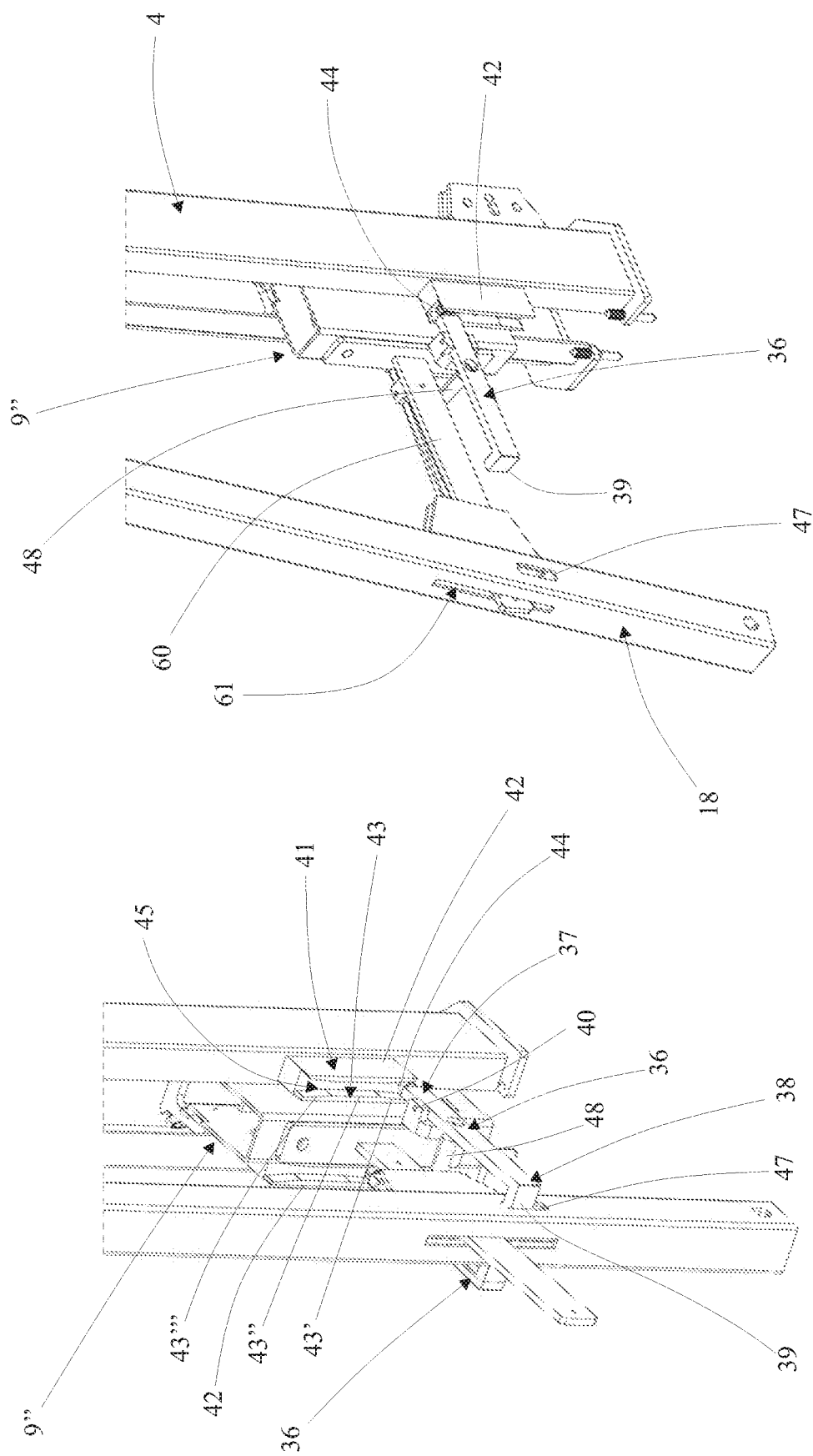

APPARATUS FOR THE TRANSPORT OF A DEVICE ALONG A CONSTRUCTION

FIELD OF APPLICATION

The present invention relates to an apparatus for the transport of a device along a construction.

The subject apparatus is intended to be advantageously installed on constructions with a predominantly long vertical development (for example on towers, torches of petrochemical plants, chimneys, trellises, silos, wells, etc.) to transport, along these constructions, devices such as devices to ignite the flame of a torch, warning lights, smoke detection devices, antennas, etc.

In particular, the subject apparatus is intended to be used to transport the aforementioned devices to the terminal portion of the construction and to bring them back to ground level without the need for an operator to go to the terminal portion of the construction itself.

PRIOR ART

Petrochemical plants, such as refineries in particular, are provided with high chimneys (even more than a hundred meters high), called in the technical jargon "torches", in which the gases produced by the oil refining processes are conveyed to be burned in order not to disperse the hydrocarbons in the environment.

In particular, on the top of the chimney there is a trigger device (called "pilot flame") which continuously produces a flame designed to burn the gases that are conveyed to the chimney. The pilot flame comprises a nozzle, intended to be positioned above the discharge mouth of the top of the chimney and able to deliver a flame to burn the gases expelled from the chimney mouth.

Furthermore, near the top of the chimney, light indicators are usually positioned to indicate the presence of the chimney itself to air vehicles, such as airplanes and helicopters. On the top of the chimney there are also installed diagnostic devices, such as for example smoke detectors.

The factory chimney must always be active to ensure the disposal of gas and to ensure the necessary safety conditions.

Therefore, the execution of the maintenance operations of the devices (pilot flame, light signaling devices, smoke detectors) directly on the top of the chimney is excessively dangerous and expensive, due in particular to the frequent development of strong flames and the high height.

In order to solve this drawback at least in part, apparatuses have long been known for conveying devices along the chimneys which comprise a carriage which holds the device fixed and is operable to slide on a vertical rail placed along the entire height of the chimney. In particular, the carriage can be operated to transport the device on top of the chimney (where the device is intended to operate) and to bring it back to the ground in order to carry out maintenance or repair operations without the need for the operators to go on top of the chimney.

Some examples of apparatuses of a known type for the transport of devices along chimneys are described in documents U.S. Pat. Nos. 4,579,522, 5,634,788 and US 2015/0252943.

In particular, document U.S. Pat. No. 4,579,522 describes an apparatus for transporting a trigger device (pilot flame) on the top of a chimney of a refinery, which comprises a pair of rails, iron or steel, fixed to the chimney and a carriage (bearing the pilot flame mounted) provided with several wheels slidingly engaged to the corresponding rails.

Moreover, the apparatus comprises a pulley for moving the carriage provided with a pulley wheel, fixed to the top of the chimney, and of a rope wrapped around the pulley wheel and having one end fixed to the carriage and the other end connected to an actuation winch placed at the base of the chimney itself.

The known type of solution briefly discussed above, although it allows performing maintenance operations on the pilot flame without having to go to the top of the chimney, has significant limits, since it does not allow guaranteeing the correct positioning of the pilot flame at the top of the chimney.

This drawback is particularly felt in the reference sector, since the correct positioning of the pilot flame, which in particular must be about 3-4 centimeters above the upper edge of the chimney and at a lateral distance from the edge of about 2-3 centimeters, is of fundamental importance as it determines the correct functioning of the entire plant.

The configuration of the rails of the apparatus of the known type referred to above does not allow determining with sufficient precision the distance of the nozzle of the pilot flame from the discharge mouth of the top of the chimney, in particular when the latter has a tapered shape or non-constant section at the top. This entails the need, during the design and construction of the apparatus, to carry out a detailed study of the shape of the rails at the top of the chimney to which the apparatus must be applied, without however being able to ensure an optimal positioning of the pilot flame, since it is particularly difficult to arrange the nozzle of the pilot flame at the desired distance from the discharge mouth of the chimney.

DISCLOSURE OF THE INVENTION

In this situation, an essential aim of the present invention is therefore to overcome the drawbacks of the prior art solutions by providing an apparatus for transporting a device along a construction that allows the device to be positioned with high precision at the terminal portion of the construction.

A further object of the present invention is to provide an apparatus for transporting a device along a construction that is constructively simple and cost-effective to make.

A further object of the present invention is to provide an apparatus for transporting a device along a construction that is able to operate in a completely efficient manner.

BRIEF DESCRIPTION OF THE DRAWINGS

The technical features of the invention, according to the aforesaid aims, can clearly be seen in the content of the claims below, and its advantages will become more readily apparent in the detailed description that follows, made with reference to the accompanying drawings, which illustrate a preferred embodiment, which is purely exemplary and not limiting, in which:

FIG. 7 shows a detail of the transport carrier in a non-operative position illustrated in FIG. 2, relating to a locking system;

FIG. 8 shows the locking system of the transport carrier in an operative position illustrated in FIG. 3;

DETAILED DESCRIPTION OF AN EXAMPLE OF A PREFERRED EMBODIMENT

Figure 1:
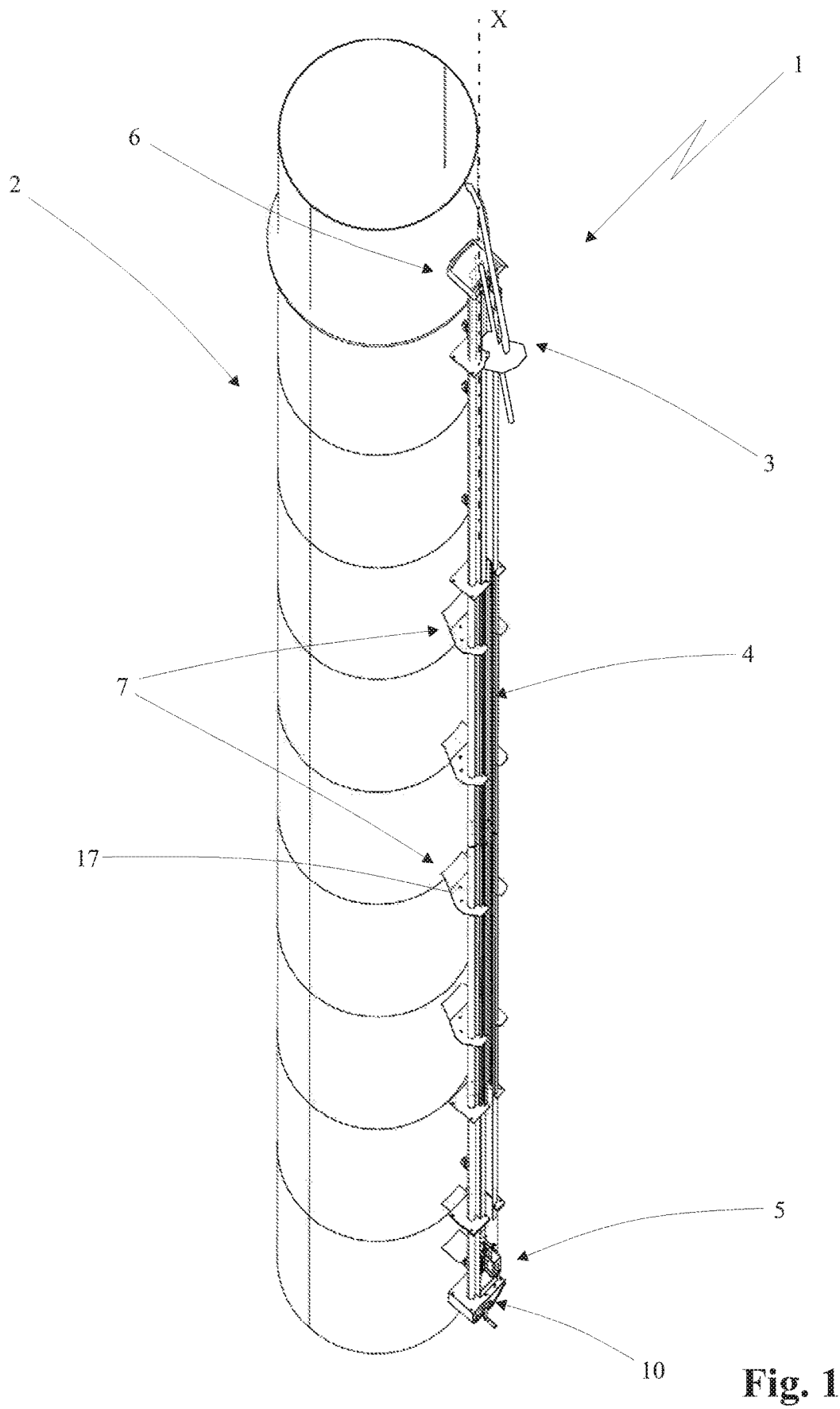
FIG. 1 shows a top perspective view of the apparatus for transporting a device along a construction, object of the present invention.
Figure 2:
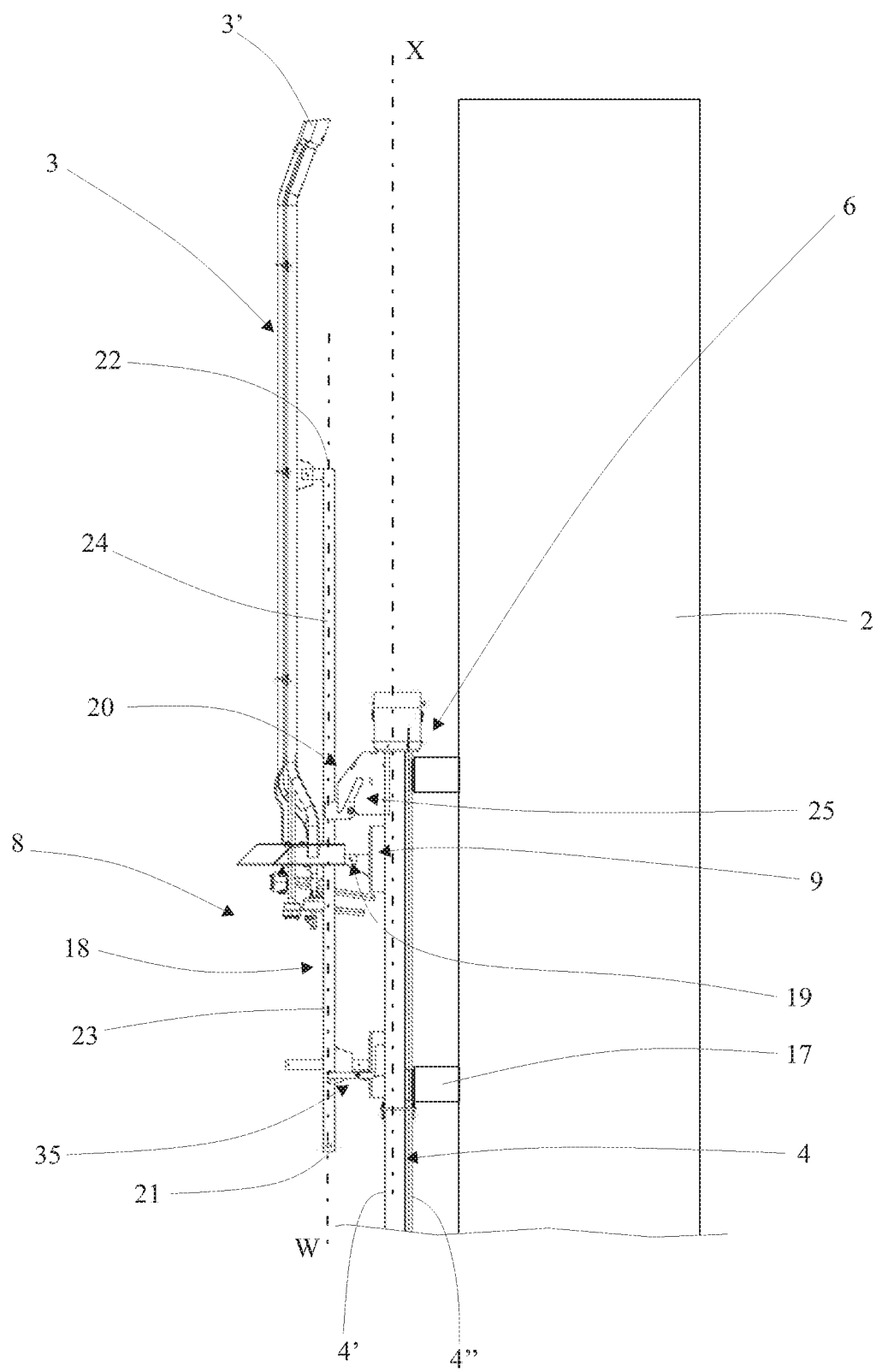
FIG. 2 shows a side view of a detail of the subject apparatus relating to a transport carrier mounted to a device and placed in a non-operative position, according to a first embodiment of the present invention.
Figure 3:
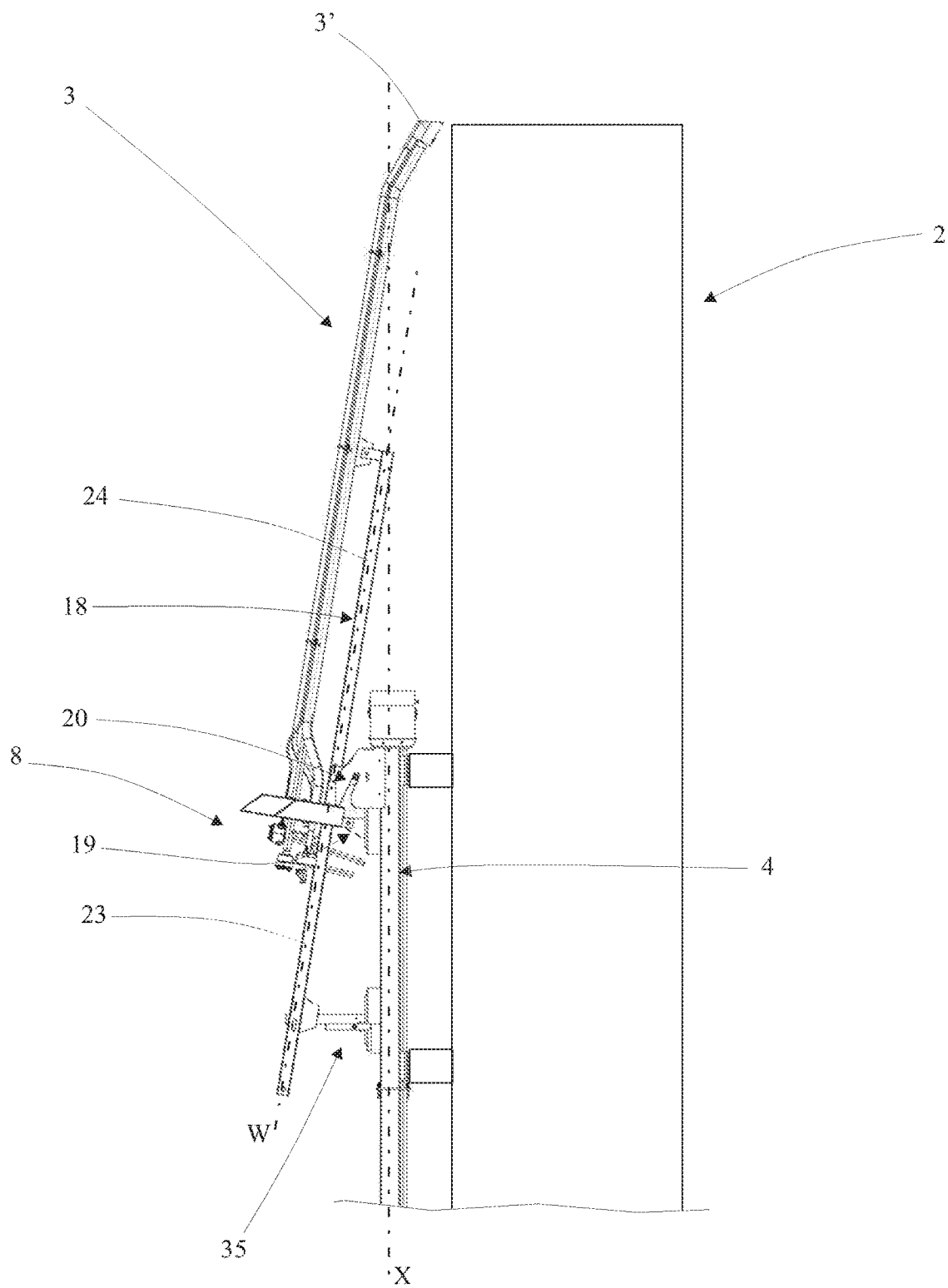
FIG. 3 shows the transport carrier of FIG. 2 in an operative position.

With reference to the accompanying drawings, the apparatus for the transport of a device along a construction, object of the present invention, has been indicated as a whole with reference numeral 1.

The subject apparatus 1 is intended to be advantageously installed on constructions 2 having mainly vertical development, which extend in particular between a base portion (generally located at ground level or in any case in a position accessible to people) and a terminal portion (placed at high height or at great depth).

In particular, the apparatus 1 is intended to be installed on towers of very high height (which can reach, for example, even 100 meters in height), such as torches of petrochemical plants, factory chimneys for energy production, pylons, etc., and in general on high structures whose top is not easily accessible by the operators.

The subject apparatus 1 is intended to be used to transport devices 3 (such as devices for igniting the flame, light signaling devices, smoke detection devices, etc.) on the terminal portion (in particular on the top) of the construction 2 and to bring these devices back to ground without the need for an operator to go to the terminal portion of the construction 2 itself.

According to the embodiment illustrated in the accompanying figures, the subject apparatus is used to transport a device 3 for triggering a flame (called in the technical jargon "pilot flame") on the top of a construction 2 consisting for example of the torch of a refinery. In particular, this triggering device 3 comprises a nozzle 3' adapted to emit a flame to ignite the gases which are expelled from the mouth of the top of the torch. Conveniently, the triggering device 3 is provided with power supply cables which comprise for example a gas supply cable for supplying the flame of the trigger device 3, such cable is connected, to one end, to the device 3 itself and, to the end other end, to a source of combustible gas placed on the ground. Moreover, the supply cables of the triggering device 3 comprise an electric cable for supplying and controlling electrical components of the device 3 itself, such as for example an electric arc ignition component, connected to a control and electrical supply unit located on the ground.

Of course, without departing from the scope of the present invention, the subject apparatus 1 may be used to transport at the top of a construction 2 any device 3, such as a light signaling device, smoke detection devices, weather sensors, construction swing sensors, surveillance devices, antennas, etc.

Similarly, the apparatus 1 is also intended for use in constructions 2 which develop in depth, such as wells, reservoirs, tanks, silos, etc., in order to transport devices 3 at the bottom end portion of the construction 2.

According to the present invention, the apparatus 1 comprises a rail 4 which extends along a guiding direction X (preferably substantially rectilinear and in particular vertical) between a first end 5 (for example lower) and a second end 6 (for example higher) thereof. The rail 4 is provided with a fixing system 7 through which it can be fixed to the construction 2, with the second end 6 of the rail 4 placed at the terminal portion (for example of the top) of the construction 2 itself.

In particular, with reference to the particular embodiments illustrated in the accompanying figures, the second end 6 of the rail 4 is positioned below the terminal portion of the construction 2 preferably spaced from this terminal portion, for example at about 2-5 meters.

Again with reference to the embodiments illustrated in the accompanying figures, the rail 4 extends along substantially the entire height of the construction 2 and has its first end 5 located at the base portion of the construction 2 itself to allow the return the device 3 to the ground.

According to a different embodiment not shown, the rail 4 is arranged along a last upper portion of the construction 2, for example the last 15-20 meters from the terminal portion of the construction 2, developing for example from the height of the construction 2 in which the last stations accessible to the operators are arranged. According to this embodiment, the first end 5 of the rail 4 is arranged at the aforementioned access stations for the operators.

According to the invention, the apparatus 1 comprises a transport carrier 8 slidable along the rail 4 and adapted to support the device 3 to be transported along the construction 2.

More in detail, the transport carrier 8 comprises at least one carriage 9 (for example two) slidingly constrained to the rail 4 to allow the transport carrier 8 to remain connected to the rail 4 and to slide along the latter.

According to the invention, the apparatus 1 further comprises a movement system 10 mechanically connected to the transport carrier 8 and operable to move the latter to slide along the rail 4 between a service position (preferably raised), in which the transport carrier 8 is placed at the second end 6 of the rail 4 to arrange the device 3 at the end portion of the construction 2 (where the device 3 is intended to operate), and an access position (preferably lowered), in which the transport carrier 8 is placed at the first end 5 of the rail 4 to bring the device 3 to the ground or to an access station (for example to carry out maintenance or repair operations).

In particular, the movement system 10 is arranged to actuate the transport carrier 8 to slide along the rail 4 in a first sliding direction (in particular upwards) to move the transport carrier 8 from the position for accessing the service position, and in an opposite second sliding direction (in particular downwards) to move the transport carrier 8 from the service position to the access position.

Advantageously, the rail 4 of the apparatus 1 comprises several hollow elongated sections 11, each of which extends longitudinally according to the guiding direction X. In more detail, the sections 11 are fixed to the construction 2 and are arranged aligned with one another succession along the guiding direction X of the rail 4 itself.

Figure 19:
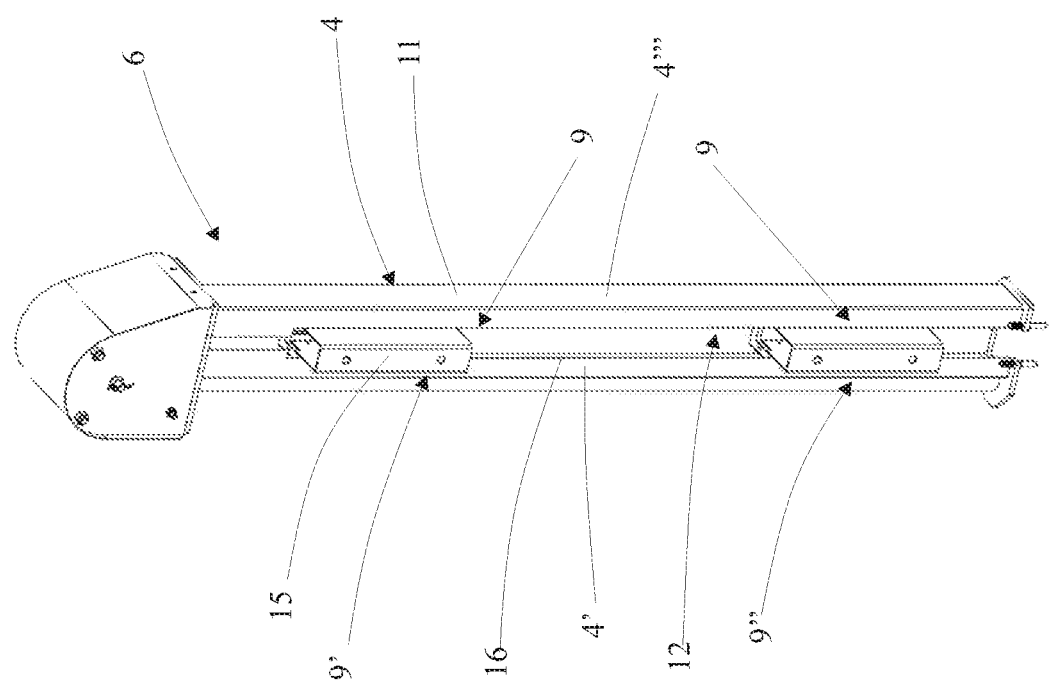
FIG. 19 shows a detail of the apparatus of the present invention, relating to a portion of a rail of the apparatus, with some parts removed to better highlight others.

With reference to the example illustrated in FIG. 19, each section 11 of the rail 4 is provided with an inner surface which delimits a guide seat 12 in which the carriage 9 of the transport carrier 8 is slidably housed.

Advantageously, each section 11 is made of a metal material, for example aluminum, and is preferably obtained by extrusion. Preferably, in the case where the construction 2 consists of a chimney or a torch, the section 11 placed at the top of the construction 2 (i.e. the section 11 which defines the second end 6 of the rail 4) is made of steel to ensure that the heat generated by the combustion of the gases expelled from the chimney does not deteriorate in any way the integrity of this section 11.

Figure 20:
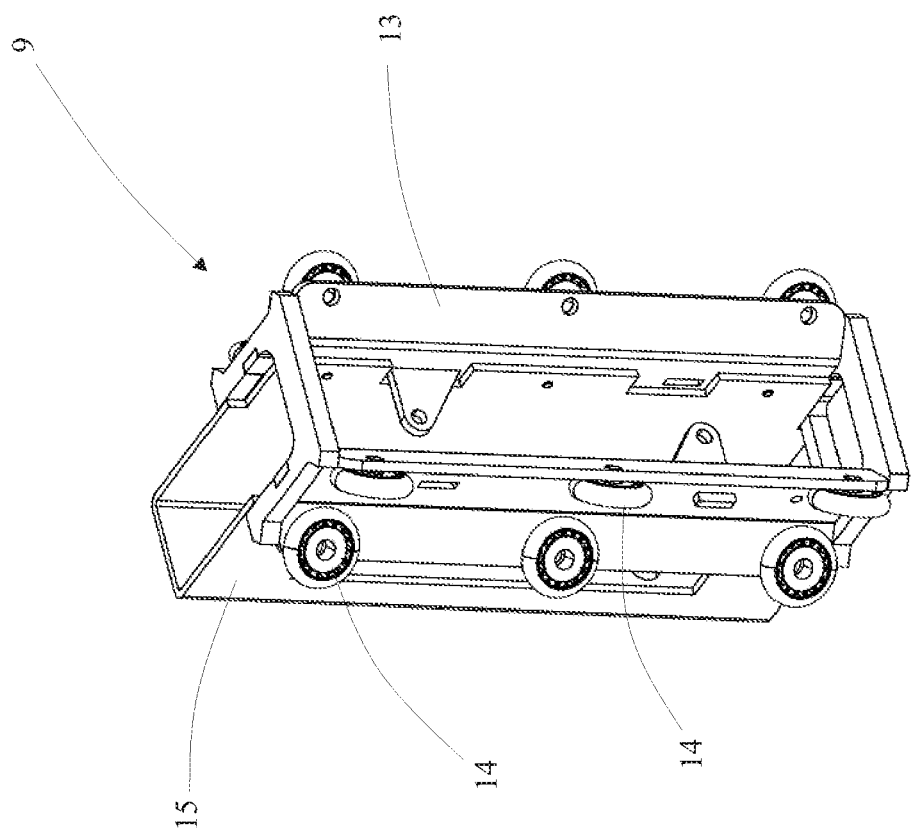
FIG. 20 shows a detail of the transport carrier relating to a carriage of the latter.

Advantageously, with reference to the example in FIG. 20, the carriage 9 of the transport carrier 8 comprises a frame 13 carrying a plurality of wheels 14 slidably engaged with the inner surface of the sections 11 of the rail 4.

Advantageously, the carriage 9 is provided with a protruding portion 15 extending outside the guide seat 12 of the sections 11 through a longitudinal slot 16 formed on each section 11, so as to support the device 3 positioned outside the guide seat 12 of the sections 11 themselves.

Preferably, the rail 4 (and in particular each of its sections 11) is provided with a front side 4' and an opposite rear side 4" parallel to the guide direction X. The rail 4, moreover, is provided with two opposite sides 4''' placed to connect the front side 4' with the rear side 4".

The transport carrier 8 is arranged on the front 4' of the rail 4 and the aforementioned longitudinal slot 16 is preferably formed.

Advantageously, according to the embodiments illustrated in the accompanying figures, the rear side 4" of the rail 4 is intended to face the construction 2 to which the rail 4 is intended to be fixed by the fixing system 7. According to a different embodiment not shown, the rail 4 can be oriented with one of the sides 4''' facing the construction 2.

Advantageously, the fixing system 7 of the rail 4, adapted to fix the latter to the construction 2, comprises several connection brackets 17 fixed to the sections 11 of the rail 4 and intended to be anchored to the construction 2.

Advantageously, the movement system 10 (which operates the transport carrier 8 to slide along the rail 4 between the access position and the service position) comprises a pulley, which is provided with an actuation device arranged at the first end 5 of the rail 4, a return pulley wheel fixed at the second end 6 of the rail 4, and a drive cable coupled to the return pulley wheel. The drive cable of the pulley is provided with a first end fixed to the actuation device and a second end fixed to the carriage 9 of the transport carrier 8. The actuation device can be operated by an operator to move the drive cable in order to make the carriage 9, and therefore the transport carrier 8, slide along the rail 4. According to the idea underlying the present invention, the transport carrier 8 of the apparatus 1 comprises an oscillating frame 18 rotatably connected to the carriage 9 by means of a hinge 19 having a preferably horizontal axis of rotation Y.

The aforesaid oscillating frame 18 is intended to carry mounted (and in particular fixed) the device 3 and is operable to rotate around the axis of rotation Y to position the latter in the desired position at the end portion of the construction 2, as explained in detail below.

For this purpose, the apparatus 1 comprises an orientation system 20 which is mechanically connected to the transport carrier 8 and, when the latter is brought to the service position, is configured to move the oscillating frame 18 to rotate about the axis of rotation Y between a non-operative position (illustrated in the examples of FIGS. 2, 9, 13, 17) and an operative position (illustrated in the examples of FIGS. 3, 10, 14, 18).

In this way, when the transport carrier 8 is brought at the terminal portion of the construction 2, the oscillating frame 18 of the latter can be rotated to precisely position the device 3 in the correct position, in particular also in the case where the terminal portion of the construction 2 has a non-constant section (for example tapered) and without the need to design and prepare specific shapes of the rail 4.

In particular, in the case in which the device 3 is a trigger device for a torch, the rotation of the oscillating frame 18 of the transport carrier 8 allows the nozzle 3' of the device 3 to be arranged at the desired distance from the upper mouth of the construction 2 to ensure the correct operation of the plant.

Obviously, the oscillating frame 18 and the orientation system 20 according to the invention are suitable for arranging in the correct position also devices 3 different from the pilot flames, such as light signaling devices, smoke detection devices, sensors, antennas, etc.

Advantageously, the oscillating frame 18 extends according to a development direction W, with a preferably elongated shape, between a first end 21, facing the first end 5 of the rail 4, and a second end 22 facing opposite to the first end 21. In particular, with reference to the examples illustrated in the accompanying figures, the first end 21 faces downwards and the second end 22 faces upwards.

Preferably, the oscillating frame 18 is provided with a lower arm 23, which extends between the hinge 19 and the aforementioned first end 21 of the oscillating frame 18, and an upper arm 24, which extends between the hinge 19 and the second end 22 of the oscillating frame 18 itself.

The device 3 (and in particular the trigger device) is intended to be fixed to the oscillating frame 18, preferably at the upper arm 24 of the latter. In particular, the nozzle 3' of the triggering device 3 is intended to project beyond the second end 22 (upper) of the oscillating frame 18 in order to be able to reach the upper mouth of the construction 2 when the oscillating frame 18 is in the operative position (as illustrated in the examples of FIGS. 3, 10, 14, 18).

Advantageously, when the oscillating frame 18 is in the operative position, the second end 22 of the latter is arranged near said guiding direction X of the rail 4, in particular being arranged at an upper level of the second end 6 of the rail 4 itself, in order to move the nozzle of the device 3 towards the upper mouth of the construction 2.

In particular, when the oscillating frame 18 is in the operative position, it is adapted to arrange the device 3 (and preferably the upper arm 24 of the oscillating frame 18 itself) to intercept the guide direction X of the rail 4, in particular above of the second end 6 of the latter.

Preferably, when the oscillating frame 18 is brought to the non-operative position (as illustrated in the examples of FIGS. 2, 9, 13, 17), it is adapted to carry its second end 22 and the device 3 away from the guiding direction X of the rail 4, to prevent the oscillating frame 18 and the device 3 from intercepting the same rail 4 during the movement of the transport carrier 8 between the service position and the access position.

Advantageously, when the oscillating frame 18 is in the operative position, the development direction W of the latter is inclined with respect to the guide direction X of the rail 4 (in particular by an angle of between 5 and 45 degrees), and preferably when the oscillating frame 18 is in the non-operative position, the development direction W of the latter is substantially parallel to the guide direction X of the rail 4.

Preferably, the rotation axis Y of the hinge 19 of the oscillating frame 18 is orthogonal to a plane of rotation (on which the oscillating frame 18 rotates) passing through the guide direction X of the rail 4 and perpendicular to the front 4' and rear 4" sides of the same rail 4.

Figure 6:
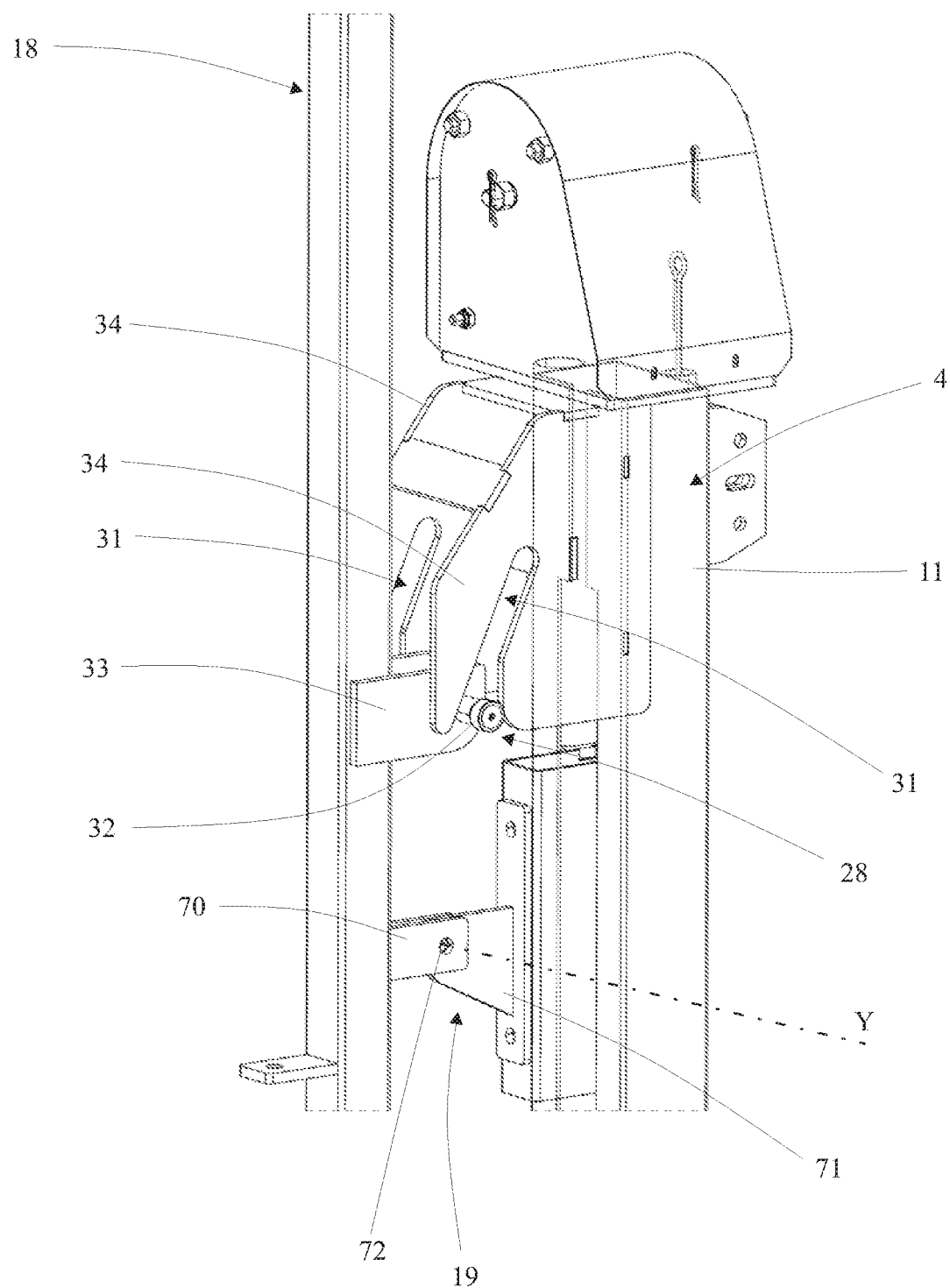
FIG. 6 shows a perspective view of the orientation system of the transport carrier in a non-operative position, with some parts removed to better highlight others.
Figure 9:
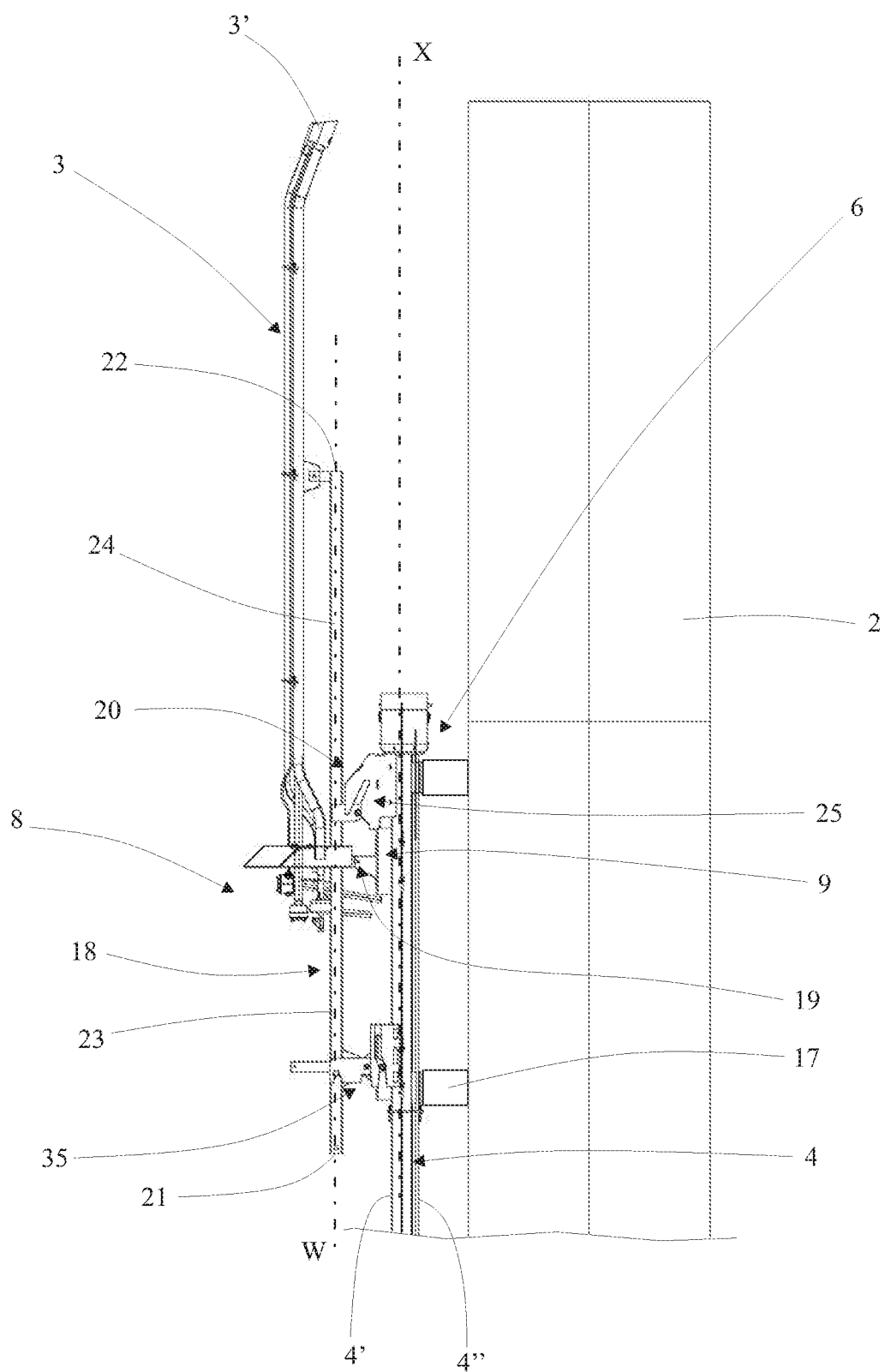
FIG. 9 shows a side view of the transport vehicle in a non-operative position, according to a second embodiment of the present invention.
Figure 10:
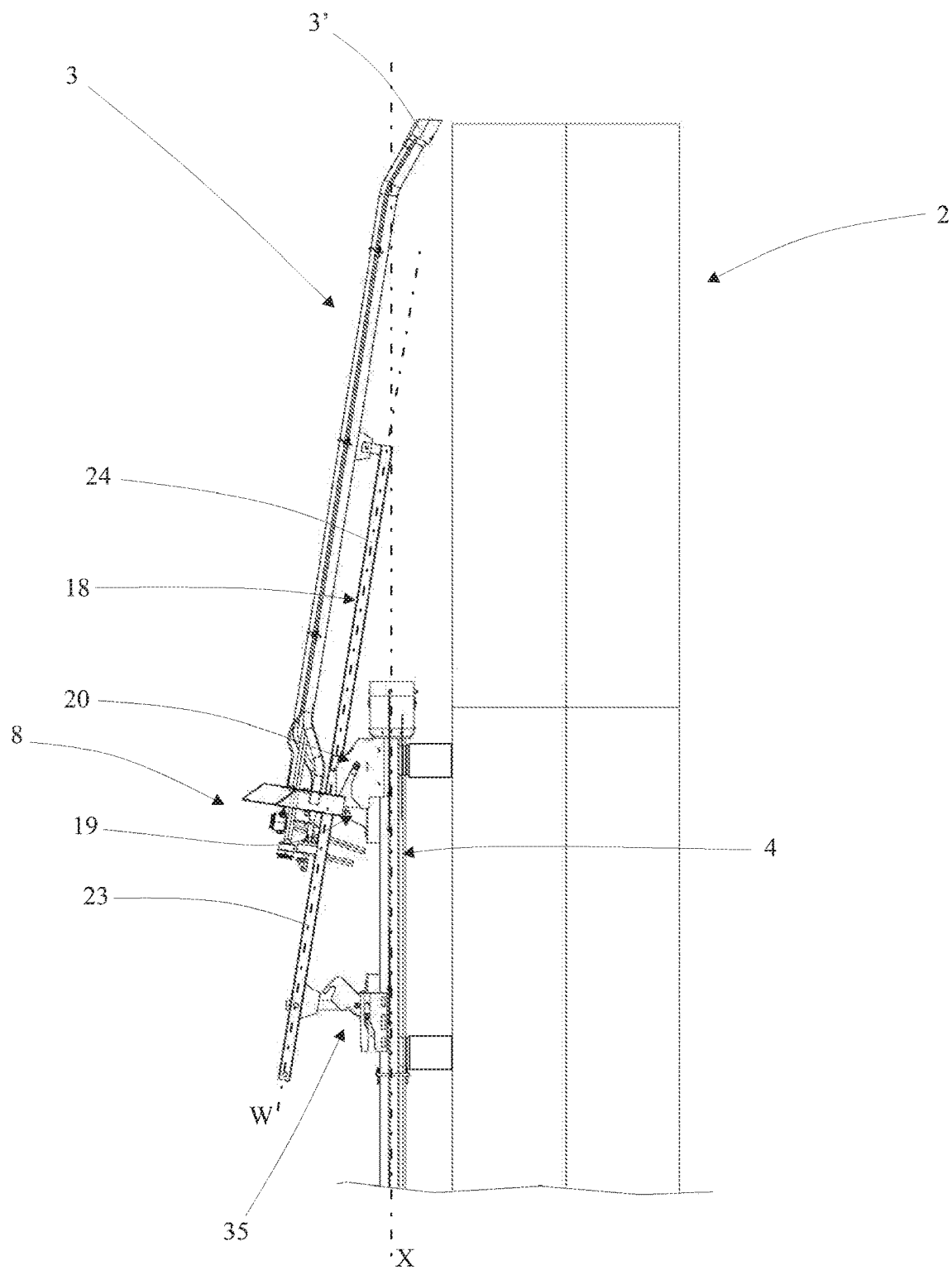
FIG. 10 shows the transport carrier of FIG. 9 in an operative position.

Preferably, with reference to the example of FIG. 6, the hinge 19 of the oscillating frame 18 comprises two wings 70, 71 connected by a connecting pin 72, of which a first wing 70 fixed to the oscillating frame 18, and a second wing 71 fixed to the carriage 9, and in particular to the projecting portion 15 of the latter.

According to the examples illustrated in the accompanying figures, the rail 4 is arranged with its rear side 4" facing the construction 2 and the rotation axis Y of the hinge 19 of the oscillating frame 18 is horizontal and parallel to the front side 4' of the rail 4, in such a way that the rotation of the oscillating frame 18 causes an approaching or removal of the device 3 with respect to the construction 2 itself.

Otherwise, the rail 4 may be arranged with one of the lateral sides 4" facing towards the construction 2, and/or the rotation axis Y of the hinge 19 of the oscillating frame 18 may be arranged with a different orientation with respect to the front side 4' of the rail 4 (in particular orthogonal to the front side 4'), for example to determine a different movement of the device 3 with respect to the construction 2 itself.

Advantageously, the orientation system 20 of the apparatus 1 (adapted to move the oscillating frame 18 between the operative position and the non-operative position) comprises a first cam mechanism 25 configured to act on the oscillating frame 18 when the transport carrier 8 is brought to the service position, in order to move the oscillating frame 18 between the non-operative position and the operative position.

Figure 5:
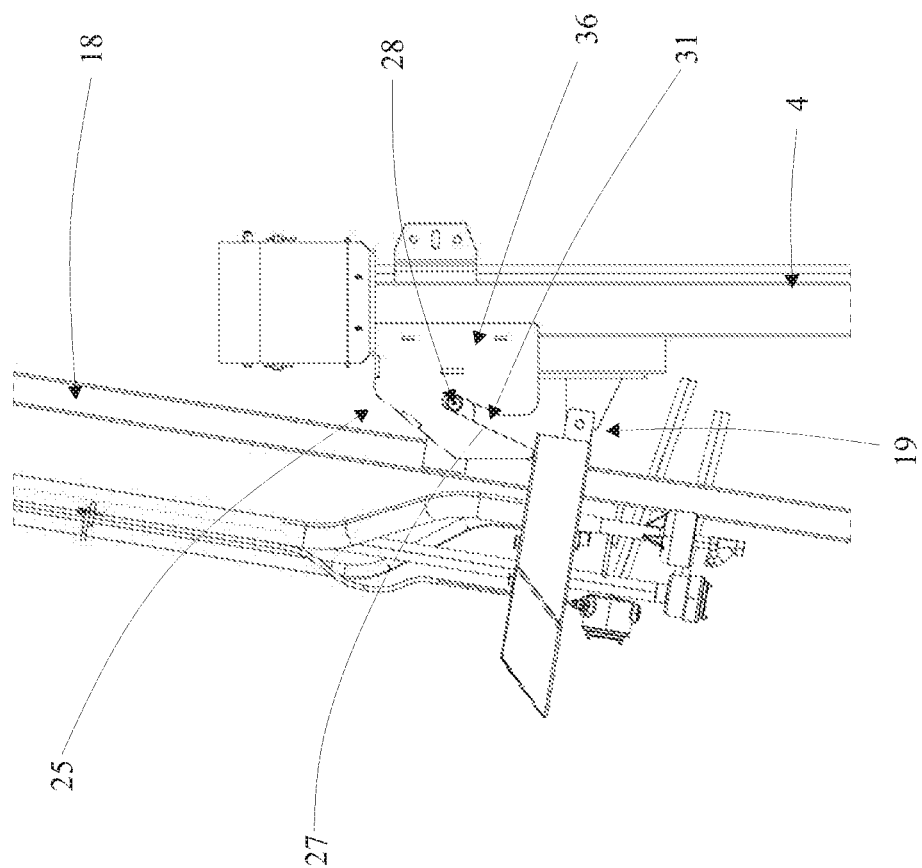
FIG. 5 shows the orientation system of the transport carrier in an operative position illustrated in FIG. 3.
Figure 4:
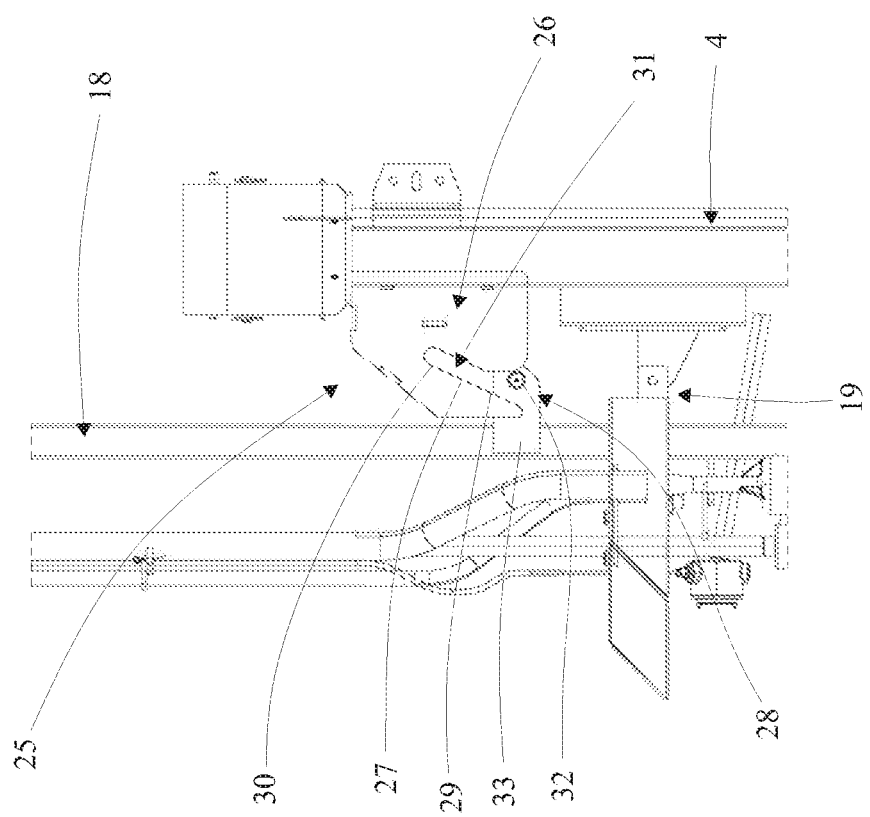
FIG. 4 shows a detail of the transport carrier in a non-operative position illustrated in FIG. 2, relating to an orientation system suitable for rotating an oscillating frame of the same transport carrier.

With reference to the example illustrated in FIGS. 4-6, the aforementioned first cam mechanism 25 comprises a first fixed cam 26 integral with the rail 4, preferably positioned at the second end 6 of the latter and fixed in particular to the section 11 of the rail 4 itself.

The first fixed cam 26 is provided with a first shaped profile 27 having such a shape that, when the transport carrier 8 is at the service position, this first shaped profile 27 determines, following the sliding of the transport carrier 8 along the rail 4, the rotation of the oscillating frame 18 between the non-operative position and the operative position.

In greater detail, the first cam mechanism 25 comprises a first cam follower 28 fixed to the oscillating frame 18 and configured to engage the first shaped profile 27 of the first fixed cam 26 when the transport carrier 8 is brought to the service position.

In particular, when the transport carrier 8 is operated by the movement system 10 to slide along the rail 4 in the first direction of movement (to be brought from the access position to the service position) and reaches the second end 6 of the rail 4, the first cam follower 28 engages with the first fixed cam 26 and follows the first shaped profile 27 of the latter moving the oscillating frame 18 from the non-operative position to the operative position (as illustrated in the example of FIG. 5).

When the transport carrier 8 is operated by the movement system 10 to slide along the rail 4 in the second sliding direction (to be brought from the service position to the access position), the first cam follower 28 follows the first shaped profile 27 of the first fixed cam 26 backwards in reverse order moving the oscillating frame 18 from the operative position to the non-operative position, until the first cam follower 28 separates from the first fixed cam 26.

Advantageously, the first shaped profile 27 of the first fixed cam 26 develops according to the aforementioned first sliding direction (in particular upwards) with an inclined pattern approaching the rail 4, and in particular approaching the front side 4' of the latter.

More in detail, with reference to the examples of FIGS. 4 and 5, the first shaped profile 27 extends from an initial portion 29 (lower), facing the first end 5 of the rail 4, to an opposite end portion 30 (upper) for positioning the first cam follower 28 so as to position the oscillating frame 18 in the operative position.

In particular, when the transport carrier 8 is operated to slide in the first sliding direction and reaches the second end 6 of the rail 4 (with the oscillating frame 18 in a non-operative position), the first cam follower 28 intercepts the first shaped profile 27 of the first fixed cam 26 at the initial part 29 of the first shaped profile 27 itself, as illustrated in the example of FIG. 4.

Following the advancement of the transport carrier 8 in the first sliding direction, the first shaped profile 27 of the first fixed cam 26 moves the first cam follower 28 towards the rail 4 until it reaches the end part 30 of the first shaped profile 27 itself, so as to bring the oscillating frame 18 into the operative position, as illustrated in the example of FIG. 5.

When the transport carrier 8 is operated to slide in the second sliding direction, the first cam follower 28 moves from the terminal part 30 to the initial part 29 of the first shaped profile 27, returning the oscillating frame 18 to the non-operative position and disengaging from the first fixed cam 26 at the aforementioned initial part 29 of the first shaped profile 27.

Preferably, the first cam follower 28 is positioned between the hinge 19 and the second end 22 of the oscillating frame 18 and, in particular, is fixed to the upper arm 24 of the oscillating frame 18 itself.

Advantageously, the first cam follower 28 comprises at least one first wheel 32 mounted on the oscillating frame 18, in particular by means of a fixing plate 33, and having an axis of revolution parallel to the axis of rotation Y of the hinge 19.

Advantageously, the first shaped profile 27 defines in the first fixed cam 26 a first guide track 31 to which the first cam follower 28 is capable of engaging with a shape coupling.

With reference to the example of FIG. 6, the first fixed cam 26 comprises two guide plates 34, parallel to the guiding direction X of the rail 4 (and in particular parallel to the plane of rotation of the oscillating frame 18), and arranged at the sides 4" of the rail 4. These guide plates 34 are each provided with a corresponding aforementioned first guide track 31 designed to engage a corresponding first wheel 32 of the first cam follower 28.

In particular, each guide plate 34 is fixed to the section 11 of the rail 4 and extends in protrusion from the front side 4' of the latter.

According to a different embodiment not shown in the accompanying figures, the first cam mechanism 25 comprises a movable cam mounted on the oscillating frame 18 and a fixed cam follower mounted on the rail 4 and adapted to intercept the movable cam when the transport carrier 8 is placed at the second end 6 of the rail 4 to move the oscillating frame 18 between the operative position and the non-operative position.

Advantageously, the subject apparatus 1 comprises a locking system 35 mechanically connected to the oscillating frame 18 of the transport carrier 8 and arranged to lock the oscillating frame 18 in the non-operative position when the transport carrier 8 is spaced from the service position.

In particular, this locking system 35 is adapted to keep the oscillating frame 18 in the non-operative position when the transport carrier 8 is in the access position and during the advancement of the latter along the rail 4 while the first cam follower 28 is not engaged with the first fixed cam 26.

Preferably, the locking system 35 is mounted on the transport carrier 8, and in particular on the carriage 9 thereof, and is adapted to act on the oscillating frame 18 to lock it in the non-operative position.

Advantageously, the transport carrier 8 comprises two carriages 9 arranged one in succession to the other, of which a first carriage 9' to which the hinge 19 is connected, and a second carriage 9" on which the locking system 35 is mounted.

Preferably, the first carriage 9' is fixed to the drive cable of the movement system 10 and the second carriage 9" is hung on the first carriage 9' by means of a connection rope (not shown in the accompanying figures).

According to a different embodiment not shown, the transport carrier 8 comprises a single carriage to which the hinge 19 and the locking system 35 are connected.

Advantageously, the transport carrier 8 comprises a guide bar 60, which is connected to the carriage 9 (and in particular to the second carriage 9") of the transport carrier 8, extending orthogonally to the driving direction X of the rail 4 (and preferably parallel to the plane of rotation of the oscillating frame 18), and is inserted in a through opening 61 of the oscillating frame 18 to exert a reaction to possible stresses to which the oscillating frame 18 is subjected, transverse to the axis of rotation Y, while allowing the oscillating frame 18 itself to rotate about the axis of rotation Y itself.

In particular, the guide bar 60 can be rigidly fixed to the second carriage 9" (as in the examples of FIGS. 2-12 and 17-18) or it can be hinged to the second carriage 9" (as in the example of FIGS. 13-16).

Advantageously, with reference to the embodiments shown in FIGS. 2-12, the aforementioned locking system 35 comprises at least one retention hook 36, which is mounted on the carriage 9 (and in particular on the second carriage 9") of the transport carrier 8, and is operable to move between a grip position, in which the retention hook 36 is constrained to the oscillating frame 18 to hold it in the non-operative position, and a release position, in which the retention hook 36 is released from the oscillating frame 18 to allow the latter to move into the operative position when the transport carrier 8 is brought to the service position.

In particular, the retention hook 36 is brought to the grip position when the first cam follower 28 is disengaged from the first fixed cam 26, to lock the oscillating frame 18 in the non-operative position. When the first cam follower 28 is engaged with the first fixed cam 26, the retention hook 36 is brought to the release position to allow rotation of the oscillating frame 18 between the non-operative position and the operative position.

In particular, with reference to the examples of FIGS. 7-8 and 11-12, the retention hook 36 of the locking system 35 extends between a rear end 37, facing the rail 4, and an opposite front end 38 preferably provided with an engagement appendage 39 adapted to engage the oscillating frame 18 when the retention hook 36 is brought to the grip position.

Moreover, the retention hook 36 is provided with a hinge pin 40 (preferably arranged between the rear end 37 and the front end 38) by which it is rotatably connected to the carriage 9 (and in particular to the second carriage 9") of the transport carrier 8.

Advantageously, again with reference to the embodiments shown in FIGS. 7-8 and 11-12, the locking system 35 comprises a second cam mechanism 41 arranged at least in part on the rail 4 and configured to intercept the retention hook 36 to move the latter between the grip position and the release position, when the transport carrier 8 is carried at the service position.

More in detail, this second cam mechanism 41 comprises a second fixed cam 42 integral with the rail 4, fixed in particular to the section 11 of the latter, and preferably positioned at the second carriage 9" when the transport carrier 8 is at the service position.

The second fixed cam 42 is provided with a second shaped profile 43 having such a shape that, when the transport carrier 8 is at the service position, this second shaped profile 43 determines, following the sliding of the transport carrier 8 along the rail 4, the rotation of the retention hook between the grip position and the release position.

More in detail, the second cam mechanism 41 comprises at least one second cam follower 44 fixed to the retention hook 36 (in particular to the rear end 37 of the latter), and configured to engage the second shaped profile 43 of the second fixed cam 42 when the transport carrier 8 is brought to the service position.

Advantageously, the second shaped profile 43 defines in the second fixed cam 42 a second guide track 45 to which the second cam follower 44 is capable of engaging with a shape coupling.

Preferably, the second cam follower 44 comprises at least one second wheel mounted on the retention hook 36 and adapted to engage the second shaped profile 43 of the second fixed cam 42 and, in particular, the second guide track 45 of the latter.

Advantageously, with reference to the examples of FIGS. 7-8 and 11-12, the second shaped profile 43 of the second fixed cam 42 is provided with a first portion 43' (preferably lower) and a subsequent second portion 43' suitable for positioning the second cam follower 44 so as to place the retention hook 36 in the release position.

Figure 11:
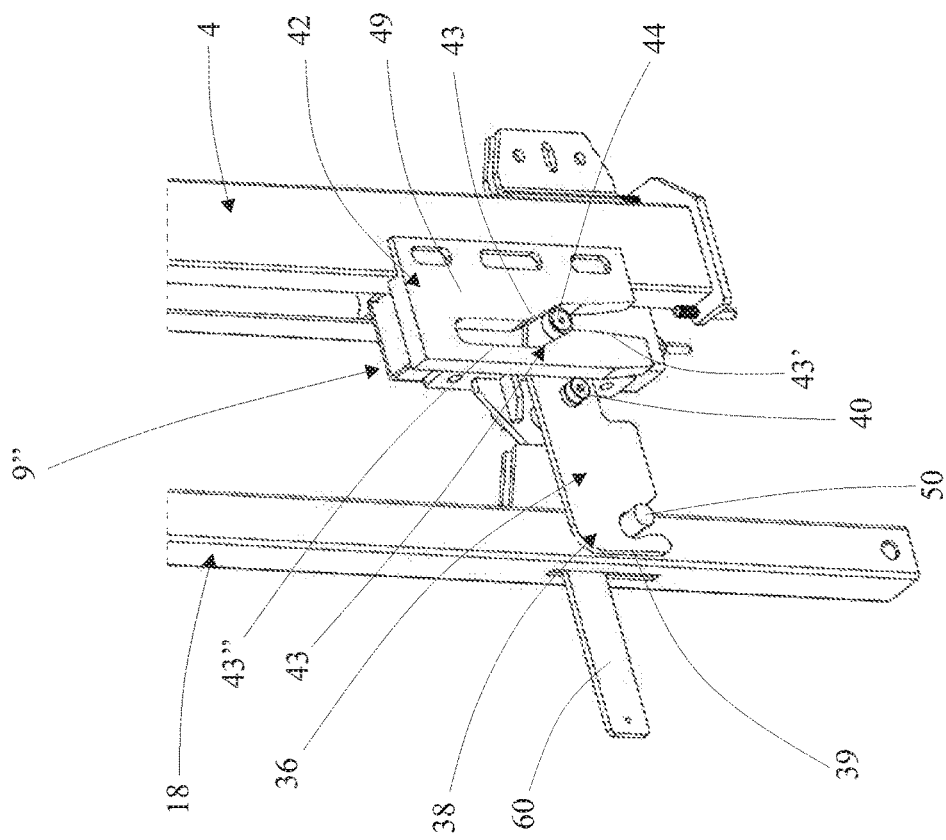
FIG. 11 shows the locking system of the transport carrier in a non-operative position illustrated in FIG. 9.
Figure 13:
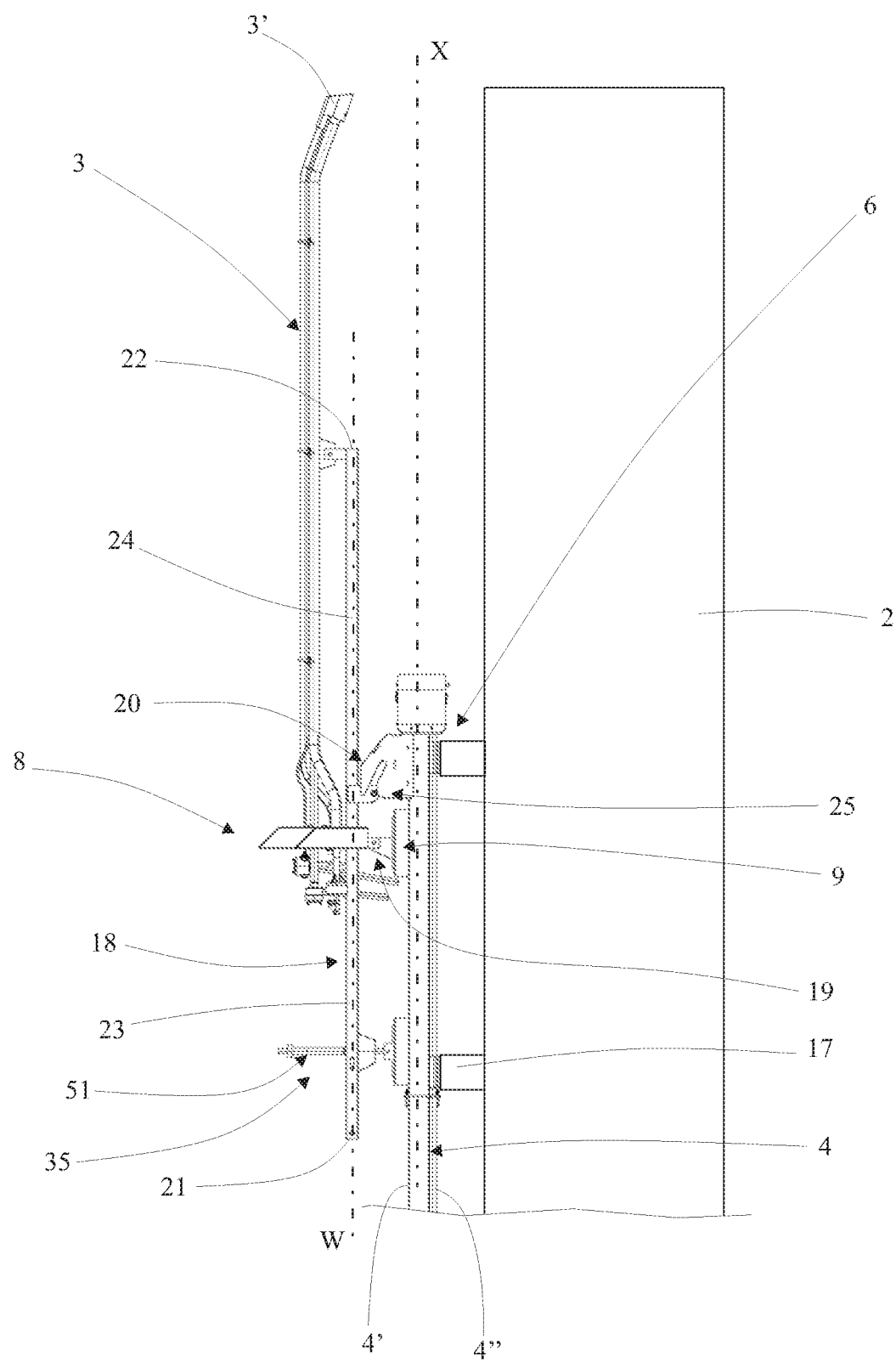
FIG. 13 shows a side view of the transport vehicle in a non-operative position, according to a third embodiment of the present invention.
Figure 14:
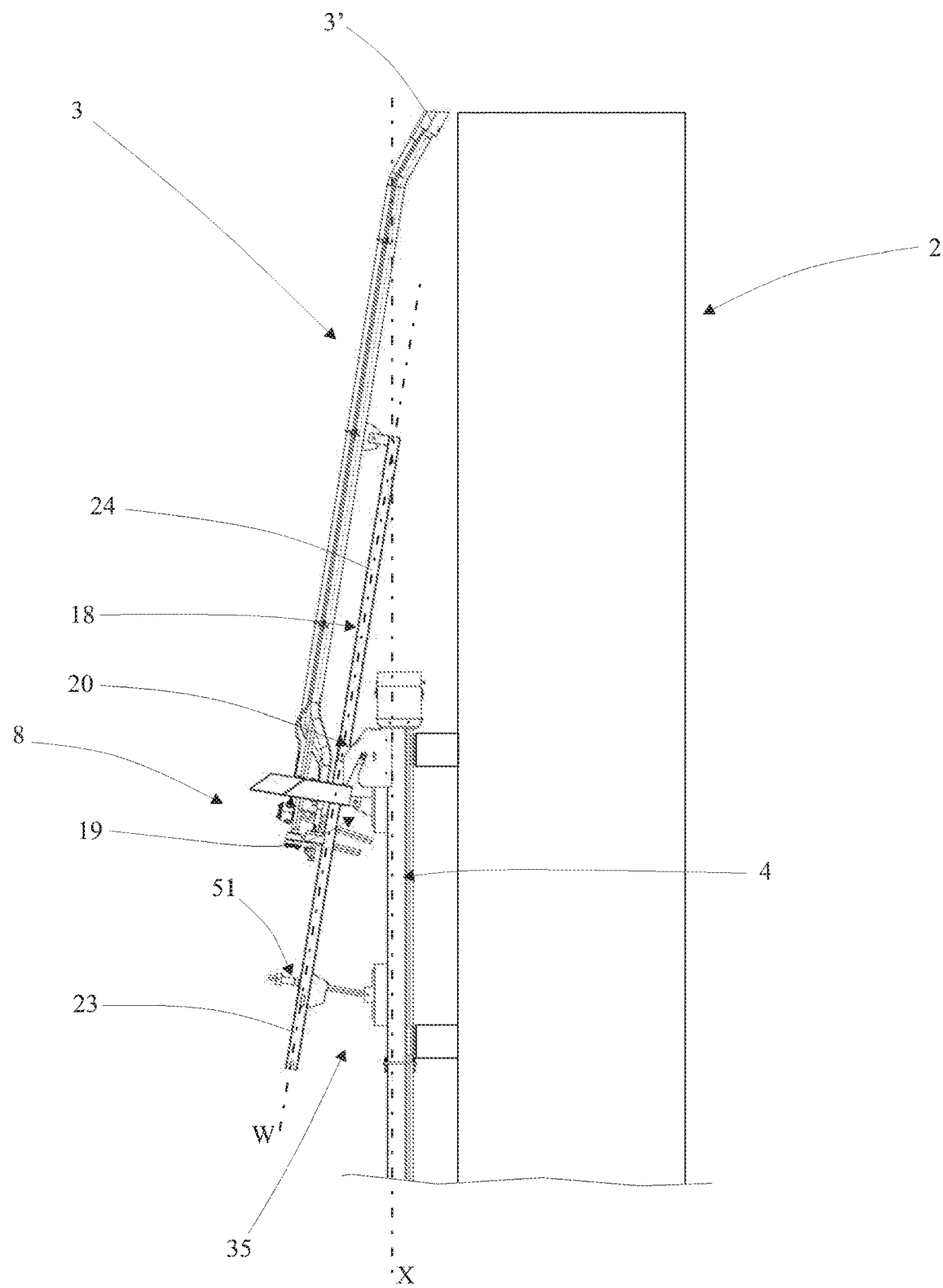
FIG. 14 shows the transport carrier of FIG. 13 in an operative position.

In particular, when the transport carrier 8 is operated to slide in the first sliding direction and reaches the second end 6 of the rail 4 (with the retention hook 36 in the grip position), the second cam follower 44 intercepts the second shaped profile 43 of the second fixed cam 42 at the first portion 43' of the second shaped profile 43 itself, as illustrated in detail in the examples of FIGS. 7 and 11.

Following the advancement of the transport carrier 8 in the first sliding direction, the second shaped profile 43 of the second fixed cam 42 moves the second cam follower 44 until it reaches the second portion 43" of the second shaped profile 43 itself, so as to bring the retention hook 36 into the release position.

When the transport carrier 8 is operated to slide in the second sliding direction, the second cam follower 44 moves from the second portion 43" to the first portion 43' of the second shaped profile 43, returning the retention hook 36 to the grip position and in such a way that the latter engages the oscillating frame 18 in the non-operative position. With reference to a first embodiment of the present invention shown in FIGS. 2-8, the locking system 35 comprises two retention hooks 36 arranged at the two sides 4''' of the rail 4.

More in detail, with reference to the examples of FIGS. 7-8, each retention hook 36 is hinged to the carriage 9 by means of the corresponding hinge pin 40 having axis parallel to the guiding direction X of the rail 4, so that the retention hook 36 is rotated to bring its front ends 38 together when they are brought into the grip position, and to remove the front ends 38 one from the other when the retention hooks 36 are brought to the release position.

Advantageously, the engagement appendages 39 of the front ends 38 of the two retention hooks 36 are folded towards each other, so that, when the retention hooks 36 are in the grip position, these engagement appendages 39 are inserted in corresponding coupling seats 47 formed on the oscillating frame 18.

Advantageously, according to the aforementioned first embodiment, the second cam mechanism 41 comprises two fixed cams 42 arranged at the two sides 4''' of the rail 4 and intended to engage corresponding second cam followers 44 mounted on the corresponding retention hooks 36.

Advantageously, the second shaped profiles 43 of the second fixed cams 42 are adapted to displace the corresponding second cam followers 44 (and therefore the corresponding rear ends 37 of the corresponding retention hooks 36) moving away from each other to bring the retention hooks 36 in the grip position, and approaching each other to bring the retention hooks 36 into the release position.

Preferably, again according to the aforesaid first embodiment, the locking system 35 comprises a return spring 48 placed in connection of the to retention hooks 36 adapted to pull the latter toward the grip position. When the second cam followers 44 arrive at the second portions 43" of the corresponding second shaped profiles 43, the latter act on the second cam followers 44 so as to overcome the elastic return force of the return spring 48 to bring the retention hooks 36 in the grip position.

Optionally, the second shaped profile 43 of each second fixed cam 42 is provided with a third portion 43''' placed in succession to the second portion 43" and adapted to bring the corresponding retention hook 36 back into the grip position after the oscillating frame 18 has been moved to the operative position (as shown in the example of FIG. 8).

According to a second embodiment of the present invention illustrated in FIGS. 9-12, the retention hook 36 of the locking system 35 is hinged to the carriage 9 (and in particular to the second carriage 9'') by means of the corresponding hinge pin 40 having axis parallel to the axis of rotation Y of the hinge 19 of the oscillating frame 18. In particular, the retention hook 36 is hinged to the guide bar 60 fixed by the second carriage 9''.

Figure 12:
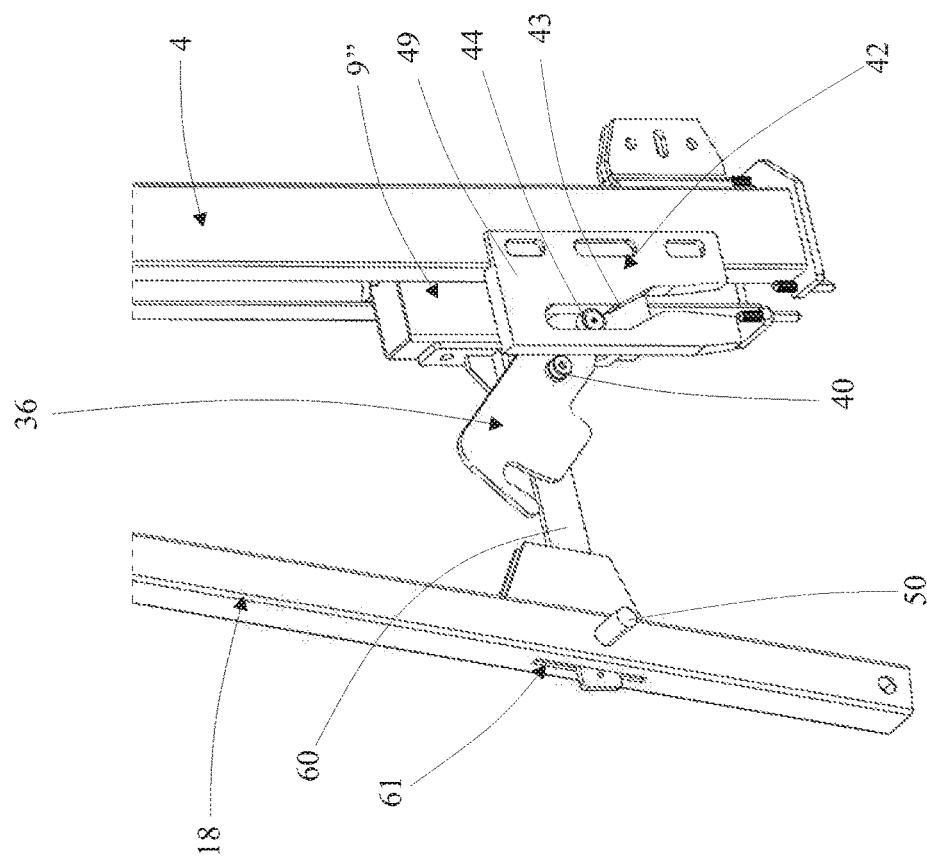
FIG. 12 shows the locking system of the transport carrier in an operative position illustrated in FIG. 10.

Preferably, the second fixed cam 42 comprises a guide plate 49 on which the second shaped profile 43 is formed, which is adapted to act on the second cam follower 44 to rotate the retention hook 36 between the grip position (shown in the example of FIG. 11) and the release position (illustrated in the example of FIG. 12).

In particular, when the retention hook 36 is in the grip position, the engagement appendage 39 is hooked to a hooking pin 50 fixed to the oscillating frame 18 and preferably parallel to the axis of rotation Y of the hinge 19.

Advantageously, according to a third embodiment of the present invention shown in FIGS. 13-16, the locking system 35 comprises an elastic member 51 mounted on the carriage 9 (and in particular on the second carriage 9'') and acting on the oscillating frame 18 for exerting an elastic force on the latter to rotate the oscillating frame 18 towards the non-operative position.

Figure 16:
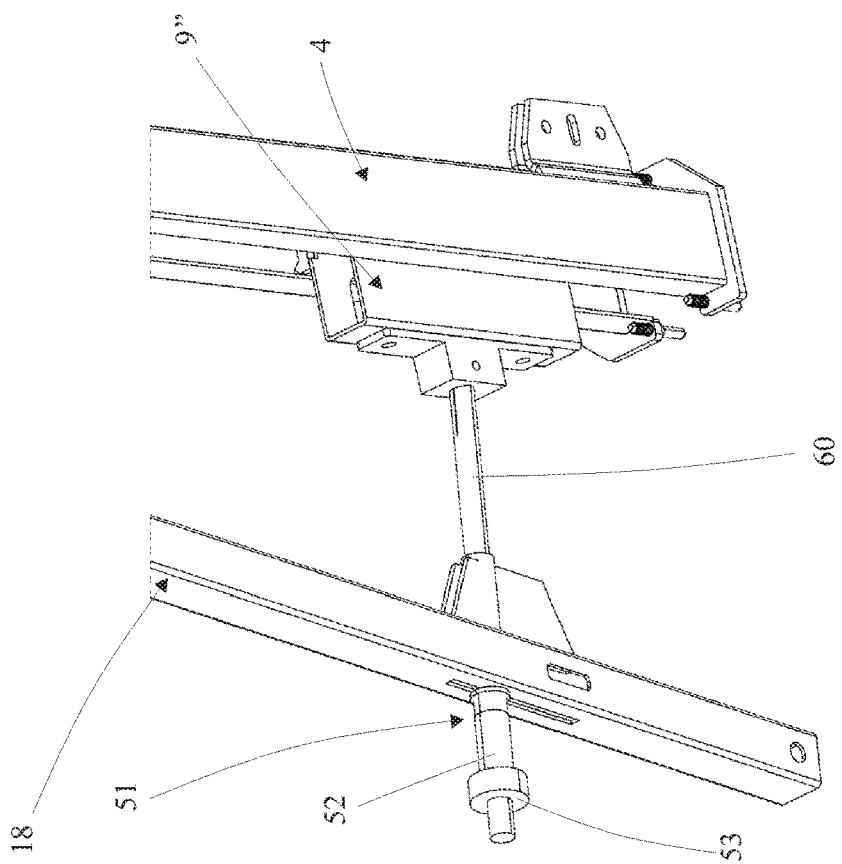
FIG. 16 shows the locking system of the transport carrier in an operative position illustrated in FIG. 14.
Figure 15:
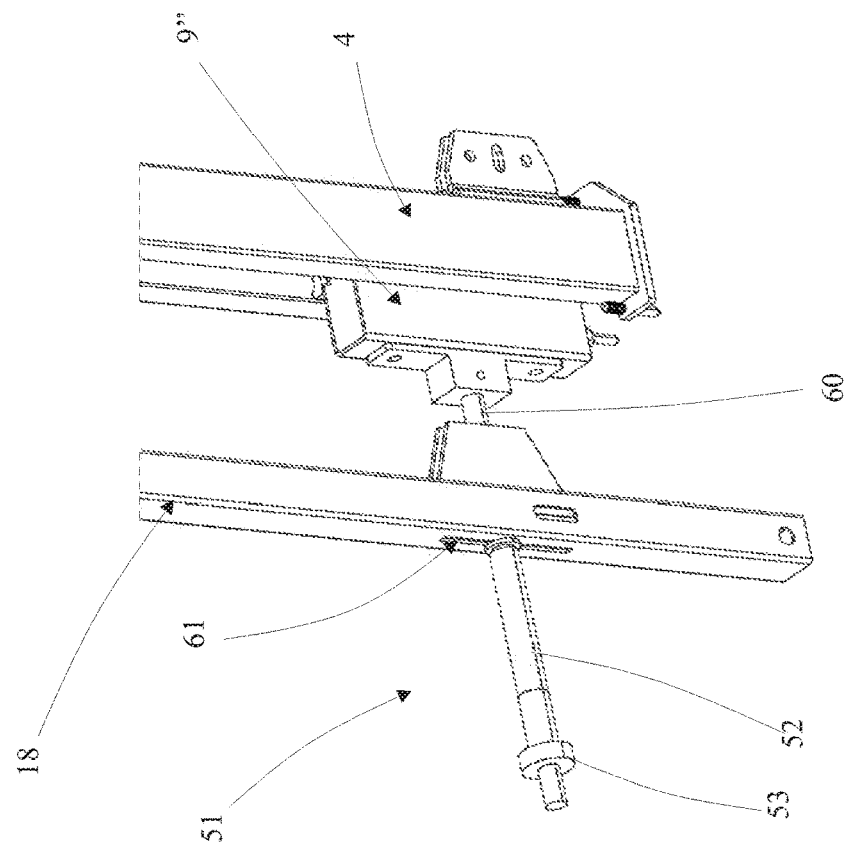
FIG. 15 shows the locking system of the transport carrier in a non-operative position illustrated in FIG. 13.

With reference to the examples of FIGS. 15 and 16, this elastic member 51 comprises a spring 52 which is mounted on the second carriage 9'' by means of the guide bar 60, and in particular is wound around a portion of the latter. More in detail, the spring 52 is compressed between the lower arm 23 of the oscillating frame 18 and an abutment portion 53 of the guide bar 60, so as to push the lower arm 23 towards the rail 4 in order to force the oscillating frame 18 to rotate towards the non-operative position.

Preferably, according to the aforementioned third embodiment, the guide bar 60 is hinged to the second carriage 9''' with the axis of revolution parallel to the axis of rotation Y of the oscillating frame 18.

Operationally, when the first cam follower 28 engages the first fixed cam 26, the first shaped profile 27 of the latter acts on the first cam follower 28 overcoming the elastic force of the elastic member 51 in order to bring the oscillating frame 18 from the non-operative position to the operative position. When the first cam follower 28 disengages from the end part 30 of the first shaped profile 27 of the first fixed cam 26, the elastic force of the elastic member 51 returns the oscillating frame 18 to the non-operative position.

Figure 17:
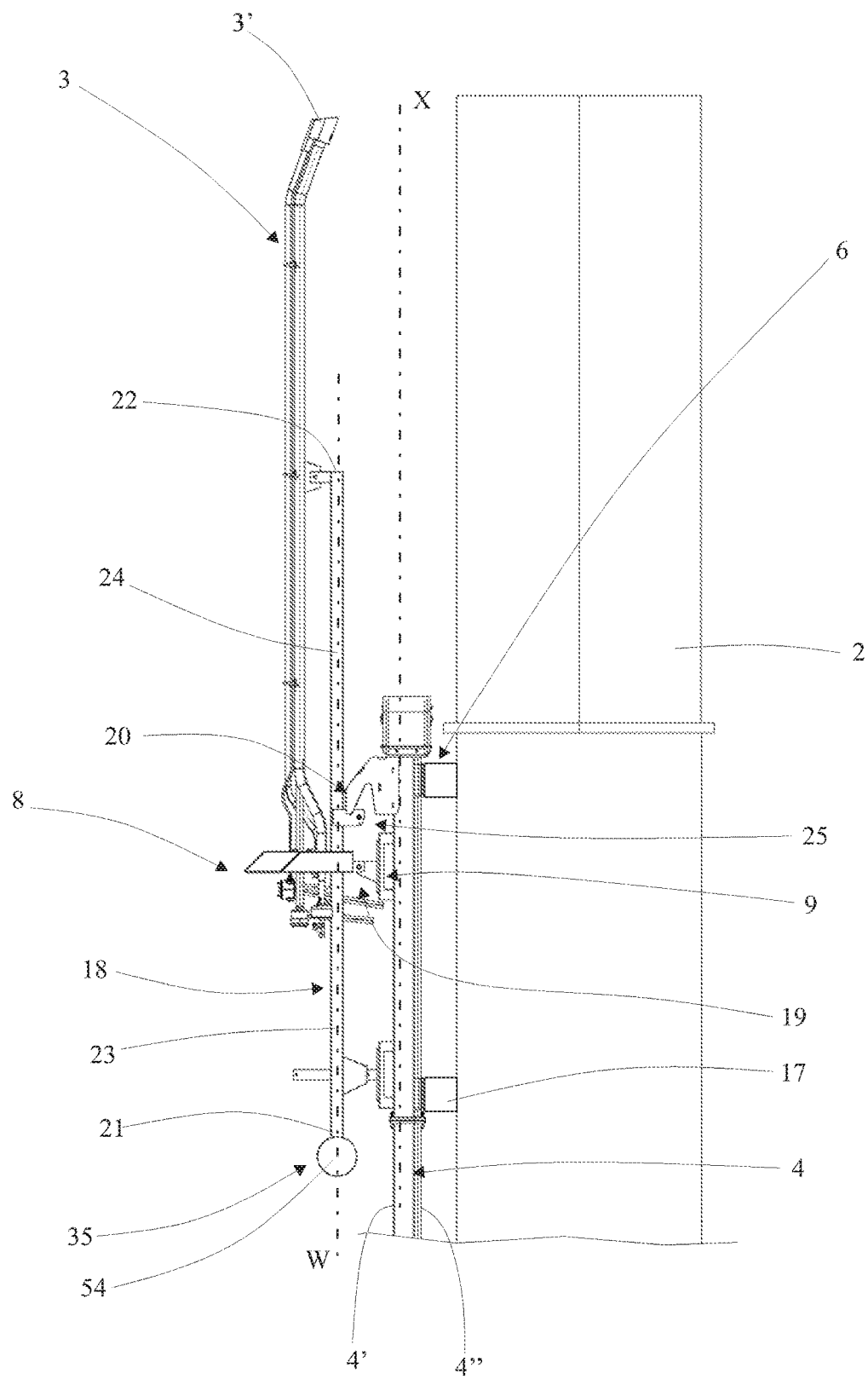
FIG. 17 shows a side view of the transport vehicle in a non-operative position, according to a fourth embodiment of the present invention.
Figure 18:
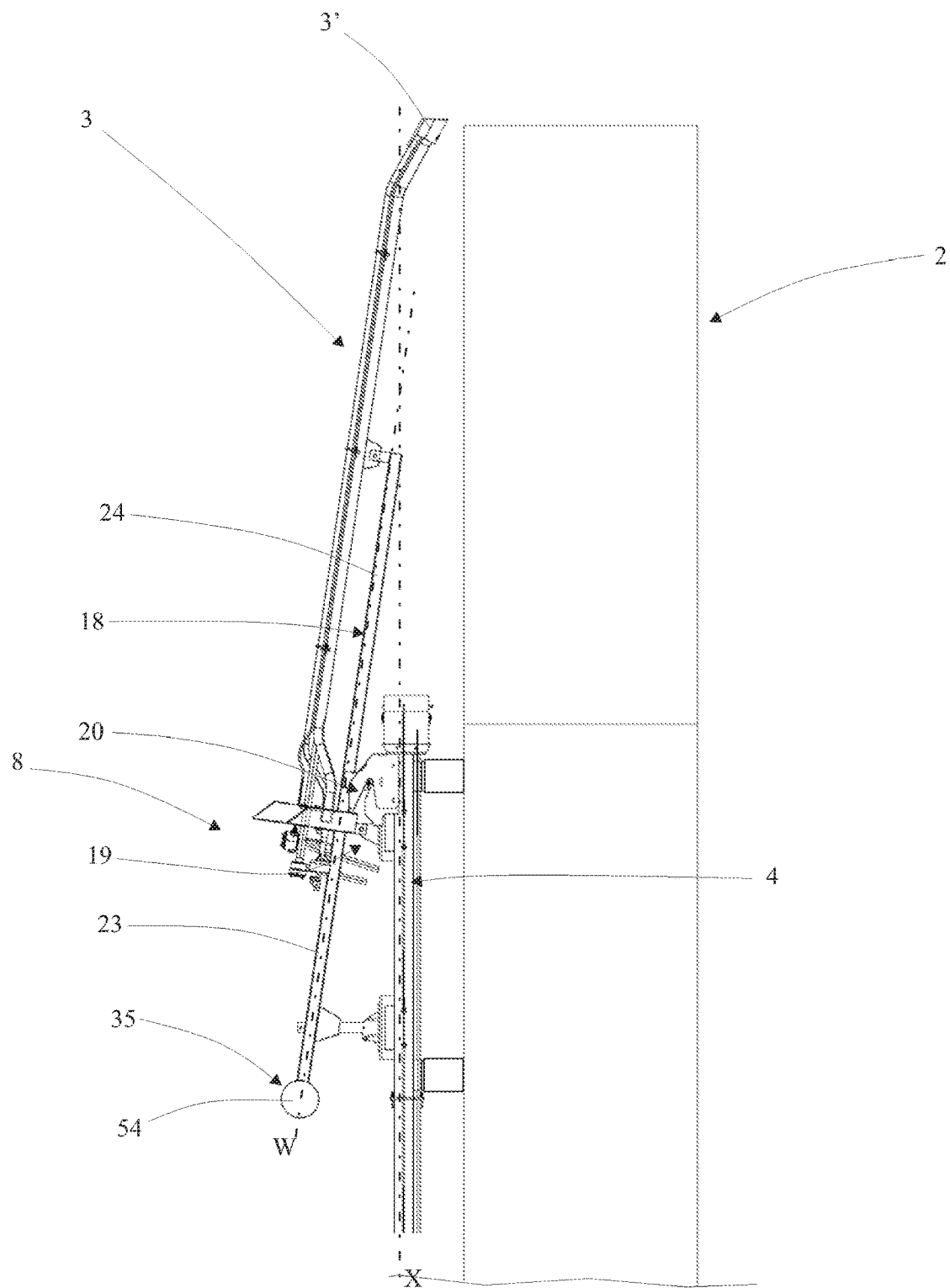
FIG. 18 shows the transport carrier of FIG. 17 in an operative position.

According to a fourth embodiment of the present invention illustrated in FIGS. 17 and 18, the locking system 35 comprises a return mass 54 fixed to the lower arm 23 of the oscillating frame 18 and configured to rotate, as a result of the action of the force of gravity, the oscillating frame 18 towards the non-operative position.

In particular, this return mass 54, following the action of the force of gravity, is adapted to generate a moment on the oscillating frame 18 which tends to rotate the latter about the axis of rotation Y from the operative position to the non-operative position.

In particular, the aforementioned return mass 54 is fixed at the first end 21 of the oscillating frame 18. According to a different embodiment not shown in the accompanying figures, the return mass 54 is distributed along the lower arm 23 of the oscillating frame 18.

Operationally, when the first cam follower 28 engages the first fixed cam 26, the first shaped profile 27 of the latter acts on the first cam follower 28 overcoming the moment generated by the return mass 54 in order to bring the oscillating frame 18 from the non-operative position to the operative position. When the first cam follower 28 disengages from the end part 30 of the first shaped profile 27 of the first fixed cam 26, the moment generated by the return mass 54 brings the oscillating frame 18 back to the non-operative position.

The invention thus conceived thus achieves the intended purposes.

The invention claimed is:

1. An apparatus for the transport of a device along a construction having extension mainly vertical between a base portion and a terminal portion, said apparatus comprising:
    a rail, which is extended, according to a substantially rectilinear guide direction (X), between a first end and a second end, and is provided with a fixing system by means of which said rail is susceptible of being fixed to said construction with said second end placed at the terminal portion of said construction;
    a transport carrier provided with at least one carriage slidably constrained to said rail and intended to carry said device mounted thereon;
    a movement system mechanically connected to said transport carrier and actuatable to move said transport carrier to slide along said rail between an access position, in which said transport carrier is placed at the first end of said rail, and a service position, in which said transport carrier is placed at the second end of said rail in order to arrange said device at the terminal portion of said construction;
wherein said transport carrier comprises an oscillating frame, which is rotatably constrained to said at least one carriage by means of a hinge having a rotation axis (Y), and is intended to carry said device fixed thereto; wherein the rotation axis (Y) of said hinge is substantially horizontal;
wherein said apparatus also comprises an orientation system mechanically connected to said transport carrier and configured to move, when said transport carrier is brought into said service position, said oscillating frame to rotate around said rotation axis (Y) between a non-operative position and an operative position;
wherein said oscillating frame is extended according to an extension direction (W) between a first end, directed towards the first end of said rail, and a second end directed in the direction opposite said first end, and said second end, when said oscillating frame is in said operative position, is arranged approaching said substantially rectilinear guide direction (X) in order to move said device close to the terminal portion of said construction;
wherein said oscillating frame is provided with an upper arm, which extends between said hinge and the second end of said oscillating frame and is intended to carry said device; wherein the rotation axis (Y) of the hinge of said oscillating frame is permanently orthogonal to a plane of rotation on which said oscillating frame rotates, wherein said plane of rotation passes through the substantially rectilinear guide direction (X) of said rail;
wherein, when said oscillating frame is in said operative position, the upper arm of said oscillating frame intercepts the substantially rectilinear guide direction (X) of said rail.

2. An apparatus for the transport of a device along a construction having extension mainly vertical between a base portion and a terminal portion, said apparatus comprising:
    a rail, which is extended, according to a substantially rectilinear guide direction (X), between a first end and a second end, and is provided with a fixing system by means of which said rail is susceptible of being fixed to said construction with said second end placed at the terminal portion of said construction;
    a transport carrier provided with at least one carriage slidably constrained to said rail and intended to carry said device mounted thereon;
    a movement system mechanically connected to said transport carrier and actuatable to move said transport carrier to slide along said rail between an access position, in which said transport carrier is placed at the first end of said rail, and a service position, in which said transport carrier is placed at the second end of said rail in order to arrange said device at the terminal portion of said construction;
wherein said transport carrier comprises an oscillating frame, which is rotatably constrained to said at least one carriage by means of a hinge having a rotation axis (Y), and is intended to carry said device fixed thereto;
wherein said apparatus also comprises an orientation system mechanically connected to said transport carrier and configured to move, when said transport carrier is brought into said service position, said oscillating frame to rotate around said rotation axis (Y) between a non-operative position and an operative position;
wherein said orientation system comprises a first cam mechanism configured for acting on said oscillating frame when said transport carrier is brought to said service position and for moving said oscillating frame between said non-operative position and said operative position.

3. The apparatus of claim 2, wherein said first cam mechanism comprises:
    a first fixed cam, which is integral with said rail, is positioned at the second end of said rail and is provided with a first shaped profile;
    a first cam follower, which is fixed to said oscillating frame and is configured for engaging said first shaped profile when said transport carrier is brought to said service position.

4. The apparatus of claim 3, wherein the first shaped profile of said first fixed cam is extended, approaching said rail, from an initial section, which is directed towards the first end of said rail, to an opposite terminal section, which is configured for positioning said first cam follower to arrange said oscillating frame in said operative position.

5. An apparatus for the transport of a device along a construction having extension mainly vertical between a base portion and a terminal portion, said apparatus comprising:
    a rail, which is extended, according to a substantially rectilinear guide direction (X), between a first end and a second end, and is provided with a fixing system by means of which said rail is susceptible of being fixed to said construction with said second end placed at the terminal portion of said construction;
    a transport carrier provided with at least one carriage slidably constrained to said rail and intended to carry said device mounted thereon;
    a movement system mechanically connected to said transport carrier and actuatable to move said transport carrier to slide along said rail between an access position, in which said transport carrier is placed at the first end of said rail, and a service position, in which said transport carrier is placed at the second end of said rail in order to arrange said device at the terminal portion of said construction;
wherein said transport carrier comprises an oscillating frame, which is rotatably constrained to said at least one carriage by means of a hinge having a rotation axis (Y), and is intended to carry said device fixed thereto;
wherein said apparatus also comprises an orientation system mechanically connected to said transport carrier and configured to move, when said transport carrier is brought into said service position, said oscillating frame to rotate around said rotation axis (Y) between a non-operative position and an operative position;

the apparatus further comprising a locking system, which is mechanically connected to said oscillating frame and is arranged to lock said oscillating frame in said non-operative position when said transport carrier is spaced from said service position.

6. The apparatus of claim 5, wherein said locking system comprises at least one retention hook mounted on said at least one carriage and actuatable to be moved between a grip position, in which said at least one retention hook is constrained to said oscillating frame in said non-operative position, and, when said transport carrier is at said service position, a release position, in which said at least one retention hook is released from said oscillating frame.

7. The apparatus of claim 6, wherein said locking system comprises a second cam mechanism arranged at least partly on said rail and configured to intercept said at least one retention hook in order to move said at least one retention hook between said grip position and said release position when said transport carrier is brought to said service position.

8. The apparatus of claim 5, wherein in that said locking system comprises at least one elastic member acting on said oscillating frame in order to exert, on said oscillating frame, an elastic force adapted to rotate said oscillating frame towards said non-operative position.

9. The apparatus of claim 5, wherein said oscillating frame is extended according to an extension direction (W) between a first end, directed towards the first end of said rail, and a second end directed in the direction opposite said first end, and said second end, when said oscillating frame is in said operative position, is arranged approaching said substantially rectilinear guide direction (X) in order to move said device close to the terminal portion of said construction;

wherein said oscillating frame is provided with a lower arm extended between said hinge and said first end, and is provided with an upper arm extended between said hinge and said second end;

wherein said locking system comprises at least one return mass fixed to the lower arm of said oscillating frame and configured to rotate, via gravity, said oscillating frame towards said non-operative position.

* * * * *